United States Patent
Meyer et al.

(10) Patent No.: US 7,272,848 B1
(45) Date of Patent: Sep. 18, 2007

(54) METHOD FOR DEVICE SECURITY IN A HETEROGENEOUS STORAGE NETWORK ENVIRONMENT

(75) Inventors: Richard Meyer, San Francisco, CA (US); Kumar Gajjar, San Jose, CA (US); Rahim Ibrahim, Mountain View, CA (US); Nghiep Tran, San Jose, CA (US); Chandra Prasad, Los Altos, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 816 days.

(21) Appl. No.: 10/076,878

(22) Filed: Feb. 13, 2002

Related U.S. Application Data

(60) Provisional application No. 60/268,694, filed on Feb. 13, 2001.

(51) Int. Cl.
*H04L 9/00* (2006.01)

(52) U.S. Cl. .......................................... 726/1; 711/163

(58) Field of Classification Search ............... 713/200, 713/201; 709/223, 229, 224–225; 707/9–10, 707/102, 103, 1; 726/1, 3; 711/100, 163, 711/150–151
See application file for complete search history.

(56) References Cited

U.S. PATENT DOCUMENTS

| | | | |
|---|---|---|---|
| 5,263,158 A | 11/1993 | Janis | |
| 5,544,358 A * | 8/1996 | Capps et al. ................ | 715/523 |
| 5,774,650 A | 6/1998 | Chapman et al. | |
| 5,935,234 A | 8/1999 | Arimilli et al. | |
| 6,073,218 A | 6/2000 | DeKoning et al. | |
| 6,208,984 B1 * | 3/2001 | Rosenthal ..................... | 707/1 |
| 6,247,077 B1 | 6/2001 | Muller et al. | |
| 6,308,173 B1 | 10/2001 | Glasser et al. | |
| 6,484,173 B1 | 11/2002 | O'Hare et al. | |
| 6,606,695 B2 | 8/2003 | Kamano et al. | |
| 6,636,950 B1 | 10/2003 | Mithal et al. | |
| 6,647,387 B1 * | 11/2003 | McKean et al. ............... | 707/9 |
| 6,678,827 B1 * | 1/2004 | Rothermel et al. ......... | 713/201 |
| 6,735,623 B1 | 5/2004 | Prust | |
| 6,766,397 B2 | 7/2004 | O'Hare et al. | |
| 6,799,254 B2 | 9/2004 | Oldfield et al. | |
| 6,816,907 B1 | 11/2004 | Mei et al. | |
| 6,832,299 B2 | 12/2004 | Shimada et al. | |
| 6,868,438 B2 | 3/2005 | Fujimoto | |
| 6,874,030 B1 * | 3/2005 | Sheth et al. ................ | 709/229 |
| 6,907,457 B2 * | 6/2005 | Merrell et al. .............. | 709/223 |
| 2002/0095602 A1 * | 7/2002 | Pherson et al. ............. | 713/201 |

OTHER PUBLICATIONS

Montague, Robert M. et al., "Virtualizing the San", Morgan Keegan Equity Research, Jul. 5, 2000, pp. 1-20.

* cited by examiner

*Primary Examiner*—T. B. Truong
(74) *Attorney, Agent, or Firm*—Wiesner & Associates; Leland Wiesner

(57) ABSTRACT

An automated, policy-based system and method provides information security at various levels in the network, including at the baseline inventory, device, network frame, and command level. This approach improves over the conventional distributed security model by centralizing security in one multi-level management structure. Embodiments of the present invention may also provide a scheme for mapping vendor-unique opcodes to access rights.

15 Claims, 4 Drawing Sheets

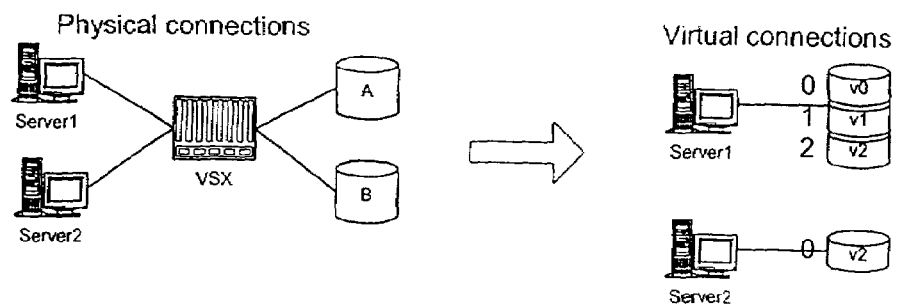
Figure 3
FIG. 4
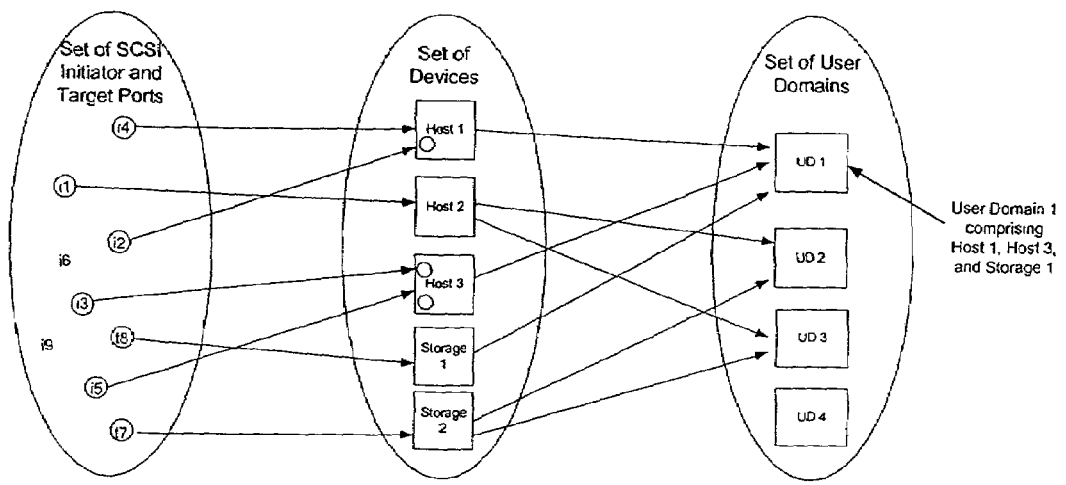
FIG. 5
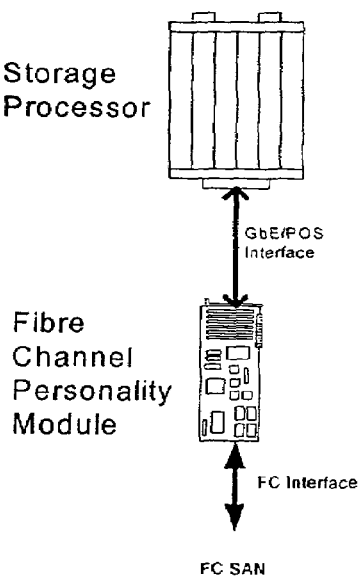

METHOD FOR DEVICE SECURITY IN A HETEROGENEOUS STORAGE NETWORK ENVIRONMENT

CROSS-REFERENCES TO RELATED APPLICATIONS

This application claims priority to U.S. Provisional Application No. 60/268,694, filed Feb. 13, 2001 and titled "Virtual Storage Systems", which is incorporated herein by reference.

BACKGROUND OF THE INVENTION

This invention relates to network computer systems having one or more host computers and one or more storage devices. Specifically, in a Storage Area Network (SAN), the invention pertains to a structure and method for making transfer of data between hosts and storage devices secure.

Storage virtualization describes the process of representing, to a user, a number of discrete physical devices as a single storage pool having a single set of characteristics. For example, in a storage area network connecting host computers with storage devices, the user perceives a single block of disk space with a defined reliability (e.g., 100 GB at RAID1); however, the user's host computer is configured to access the storage devices such that 100 GB at RAID1 is provided, regardless of whether the data is stored on a single RAID1 disk array or is split across multiple, separate disks.

In the above situation, each host computer must be aware of the storage devices connected to the storage area network because each host computer manages the storage virtualization that is presented to its users. When the storage devices connected to the storage area network are modified (such as a new device being added or an existing device being removed), each host computer must be reconfigured to accommodate the modification. Such reconfiguration involves work by network administrators and ensures that changes in the network are not seamless.

Sharing storage between clustered hosts, or clustered applications may require sophisticated access controls to prevent problems with data integrity. Usually, such access controls are distributed throughout the network. The host manages access to volumes by applications using access control lists of the file system. The host bus adapter manages access to the raw volume using Logical Unit Number (LUN) masking. A fibre channel switch manages access from one port to another using port zoning and can provide switch-based LUN masking. Lastly, the storage device itself manages access to volumes using LUN masking.

However, managing device security as described above (i.e. a box at a time), does not scale when considering large SANs. In addition, every time the SAN changes by adding or removing an element, the administrator and must reconfigure access rights manually. Mistakes made during this process can create the potential for security breaches.

Data Warehouses (and Data Marts) are critical components of an enterprise's Decision Support System. These components organize and collect data into databases available for searching and mining for information using Business Intelligence solutions. These collections of data often serve as the basis of crucial business decisions.

In order to support data warehouses and data mining applications, storage systems may offer shared access to storage devices. Typically, such shared access can be READ/WRITE or READ ONLY. Usually, one host is granted write access to a SCSI LUN and serves to load and update the database. Once all the data is loaded, the access rights of that host become READ only. Another host is used to copy the data into other databases, from which reports and other analyses are generated. Lastly, mined information may be presented READ ONLY as WEB pages using WEB servers.

To change the access rights of a host under the configuration just described is a manual process. Because data mining is done on a periodic basis (such as daily or monthly), and because changing access rights is performed manually, such applications may consume substantial resources to manage the operation.

Another potential security issue in a heterogeneous, open-systems environment relates to Vendor-unique requests, and in particular in-band management. Specifically, access control on a SCSI logical unit may not be possible on Vendor-unique requests without knowing exactly the effect of the request on the unit. For example, READ only access rights granted to a host should not permit an in-band management request from that host to remove a LUN, or to modify a SCSI mode page.

A similar potential security problem relates to unit reservation. When commands are Vendor-unique, it may not be possible to known if executing a command violates unit reservation.

Still another potential security issue may be referred to as "World Wide Name (WWN Spoofing". The use of the port WWN to restrict access is known. However, the host WWN may readily be obtained through unauthorized server access (a "break in"). And once the host WWN has been obtained, another port can be inserted into the network using the same WWN.

Accordingly, embodiments of the present invention are directed toward improvements of security in storage network devices.

BACKGROUND OF THE INVENTION

In order to provide improvements in storage area networking, embodiments of the present invention provide an automated, policy-based system and method for providing device security at various levels in the network, including on the baseline inventory, physical devices, commands, and network frame. This approach improves over the conventional distributed security model by centralizing security in one multi-level management structure. Embodiments of the present invention may also provide a scheme for mapping vendor-unique opcodes to access rights.

An embodiment of a method of controlling security of information on a storage area network (SAN) comprises providing a SAN comprising a plurality of host and storage devices and a management interface. A plurality of users of the SAN are identified, each user having a different security profile. Each user is assigned a user domain. A list of authorized user domains is assigned to each device of the SAN during a device initialization process, such that the existence of the device on the SAN is revealed only to users assigned the authorized user domain. A security reporting policy is created through the management interface, such that attempted detection of a SAN device by a user lacking the authorized user domain produces an output recognizable by an administrator of the SAN.

An alternative embodiment of a method of controlling security of information on a storage area network (SAN) comprises providing a SAN comprising a plurality of host and storage devices and a management interface. A baseline inventory of all devices connected with the SAN is conducted. A security reporting policy is created through the management interface, such that a change in the baseline inventory of the SAN produces an output recognizable by an administrator of the SAN.

Another alternative embodiment of a method of controlling security of information on a storage area network (SAN) comprises providing a SAN comprising a plurality of host and storage devices and a management interface. An information frame in a first frame format including a header and a payload is received at a personality modulate from a host device, the header including source device information and destination device information corresponding to the host device. The personality module is caused to encapsulate the information frame into a second frame including a header and a payload, the header including a copy of the source device information and the destination device information. The second frame is transmitted to a storage processor of the SAN, and the storage processor is caused to detect consistency between the source device information and the destination device information of the header and the payload. A security reporting policy is created through the management interface, such that a failure to match the source device information and the destination device information of the header and payload of the second frame produces an output recognizable by an administrator of the SAN.

Still another embodiment of a method of controlling security of information on a storage area network (SAN) comprises providing a SAN comprising a plurality of storage devices and a management interface. A plurality of host devices are in communication with the SAN, the host devices configured to transmit vendor-specific opcodes to the SAN. A storage processor is provided including a table correlating the vendor-specific opcodes with a level of access right specific to a particular storage device, the level of access right selected from the group consisting of ALL, READ ONLY, LIMITED, and NO ACCESS. The user is allowed to access the particular storage device according to the access rights granted by the vendor-specific opcode. A security reporting policy is created through the management interface, such that attempted access of a particular storage device contrary to the granted access rights produces an output recognizable by an administrator of the SAN.

An additional alternative method of controlling security of information on a storage area network (SAN) comprises providing a SAN comprising a plurality of storage devices and a management interface. A plurality of host devices are provided in communication with the SAN, the host devices configured to transmit opcodes to the SAN. A storage processor is provided including a table correlating the opcodes with a level of access right specific to a particular storage device, the level of access right selected from the group consisting of ALL, READ ONLY, LIMITED, and NO ACCESS. The user is allowed to access the particular storage device according to the access rights granted by the opcode. A security reporting policy is created through the management interface, such that attempted access of a particular storage device contrary to the granted access rights produces an output recognizable by an administrator of the SAN. A rule-based security action policy is also created through the management interface, such that the granted access rights can be automatically scheduled and varied over time as authorized by an administrator of the SAN.

Details of particular embodiments of the present invention can be seen in the following drawings and detailed description.

BRIEF DESCRIPTION OF THE DRAWINGS

FIG. 3 is a schematic diagram showing connections in a storage area network.

FIG. 4 is a schematic diagram of a virtual data center in accordance with embodiments of the present invention.

FIG. 5 is a schematic diagram showing the storage processor utilizing the fibre channel personality module.

DETAILED DESCRIPTION OF THE INVENTION

Figure 1:
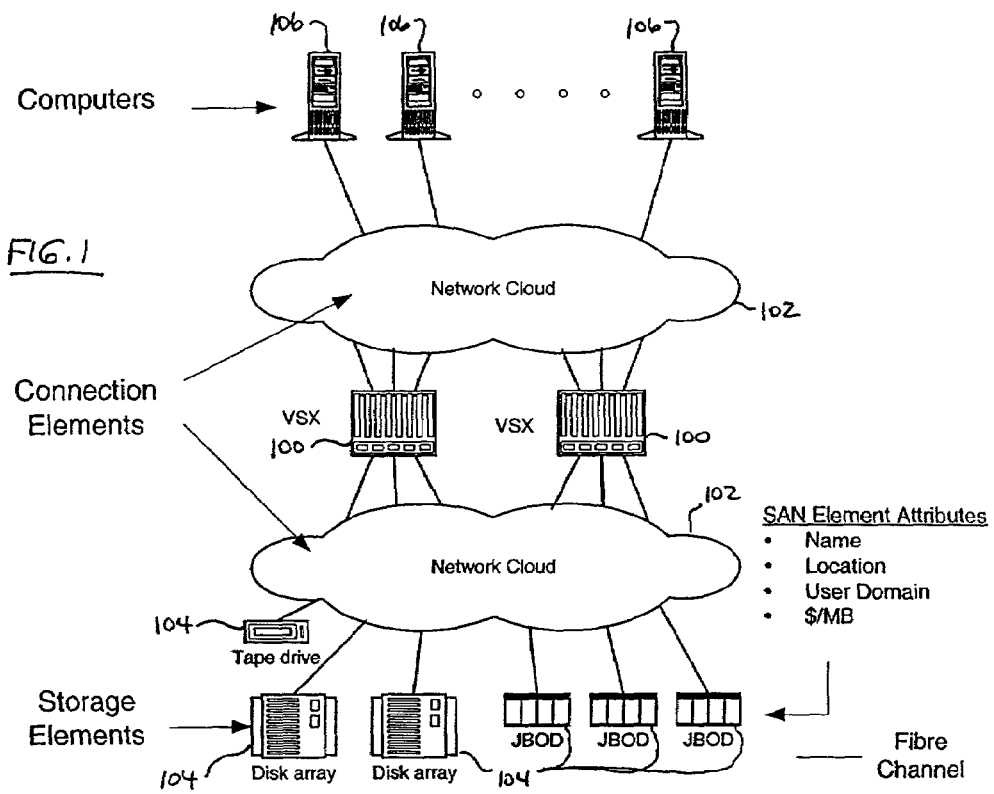
FIG. 1 is a block diagram of a storage area network including a storage server according to an embodiment of the present invention.

FIG. 1 shows a storage server 100 according to an embodiment of the present invention. The figure also shows a storage area network (SAN) 102, a number of physical storage devices 104, and a number of host computers 106. The storage server 100 is also referred to as a Virtual Storage Exchange (VSX) and is further detailed in FIG. 2.

The SAN 102 can be any type of computer network. It is referred to as a storage area network in the present application because that is its relevant function with respect to the embodiments of the present invention. A storage area network (SAN) is a network whose purpose is the transfer of data among storage elements and between computer systems and storage elements. A SAN consists of two elements: a communication infrastructure, which provides physical connections, and a management layer, which organizes the connections, storage elements, and computer systems so that data transfer is secure and robust.

In an embodiment of the present invention, the SAN 102 is a Fibre Channel network, the host computers 106 and the storage devices 102 are configured to communicate with a Fibre Channel network, and the storage server 100 is also configured to communicate with a Fibre Channel network. Thus, the storage server 100 can be easily added to an existing SAN.

The physical storage devices 104 include tape drives, disk arrays, JBODs ("just a bunch of disk"), or other types of data storage devices. The physical storage devices 104 can be connected directly to the host computers 106 via the SAN 102 or can be indirectly connected to the host computers 106 via the SAN 102 and the storage server 100. As discussed above in the Background, management of storage virtualization is burdensome when the storage devices 104 are directly connected to the host computers 106 via the SAN 102. The present invention improves management of storage virtualization by using the storage server 100 to indirectly connect the storage devices 104 to the host computers 106.

The host computers 106 can be serves or stand-alone computers. The host computers 106 can be directly connected to the SAN 102 or indirectly connected via a switch, router, or other communication link.

Figure 2:
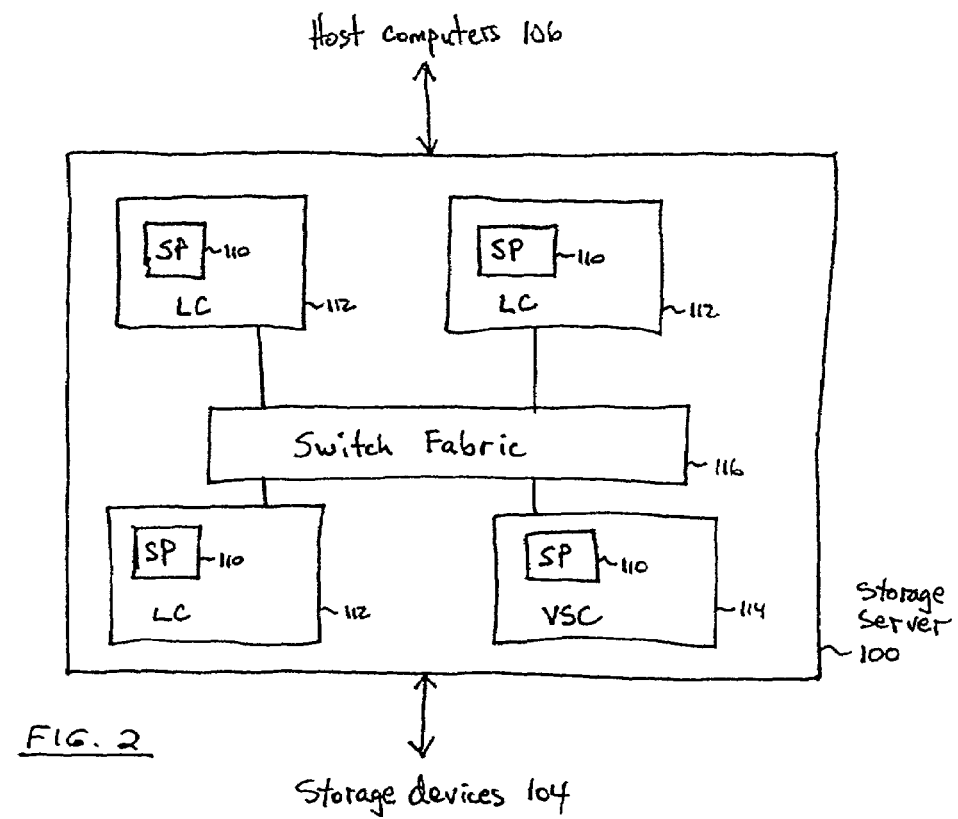
FIG. 2 is a block diagram of hardware components in the storage server according to an embodiment of the present invention.

FIG. 2 is a block diagram of the storage server 100 showing the hardware components related to embodiments of the present invention, including a storage processor 110, a line card 112, a virtual server card 114, and a switch fabric 116.

Storage server 100 may include one or more storage processors 110. The storage processors 110 process the storage commands and data to be stored as information flows between the host computers 106 and the storage devices 104. One or more of the storage processors 110 may be included on each line card 112. The storage server 100 includes space for numerous line cards 112, so the capabilities of the storage server 100 can be modularly increased by adding more line cards 112 or more storage processors 110. Each storage processor 110 is associated with one or more ports of the storage server 100.

The storage server 100 may include one or more virtual server cards 114. The virtual server cards control the operation of the storage server 100 and control the line cards 112, which perform the actual work of transferring commands and data.

The switch fabric 116 connects the storage processors 110. The switch fabric switches information received at one port to another port of the storage server 100. For example, when a host computer 106 wants to read data stored on the storage area network 102, its request is processed by the storage processor 110 associated with the port associated with that host computer 106. That storage processor 110 is referred to as the upstream storage processor 110. The upstream storage processor 110 communicates with a downstream storage processor 110 associated with the port associated with the storage device 104 storing the data to be read, via the switch fabric 116. Then the switch fabric 116 transfers the data read from the storage device to the host computer 106, via the downstream and upstream storage processors 110.

Embodiments in accordance with the present invention may provide an automated, policy-based system and method for providing device security at various levels in the network, including physical devices, commands, and network frame. This approach improves over the conventional distributed security model by centralizing security in one multi-level management structure. Embodiments of the present invention may also provide a scheme for mapping vendor-unique opcodes to access rights.

FIG. 3 shows a schematic diagram of connections of a SAN in accordance with one embodiment of the present invention. The VSX is placed in the SAN between the computers and the storage devices. The primary function of VSX is to centralize the management layer in the SAN. The VSX organizes the connections, storage elements, and computer systems into abstract relationships in order to facilitate secure and robust data transfer.

The present application is related to other applications, filed on this date and assigned to the present assignee, that are directed to other aspects of storage servers and that claim priority to U.S. Provisional Application No. 60/268,694 above: U.S. patent application No. 10/077,696 US entitled "Silicon Based Storage Virtualization Server"; U.S. patent application No. 10/076,855 entitled "Storage Virtualization and Storage Management to Provide Higher Level Storage Services"; U.S. patent application No. 10/076,909, entitled "Method and Apparatus for Identifying Storage Devices"; U.S. patent application No. 10/077,482, entitled "System and Method for Policy Based Storage Provisioning and Management"; U.S. patent application No. 10/077,181, entitled "Virtual Data Center"; U.S. Pat. No. 7,039,827, entitled "Failover Processing in a Storage System"; U.S. patent application No. 10/077,199 entitled "RAID at Wire Speed.

INVENTORY BASELINE SECURITY

Security may be provided at the device level by providing an inventory baseline of SAN elements so that variation from the baseline can be noticed. The security problem posed by WWN spoofing is not possible without changing the baseline.

When instructed by the user, or from a user-based policy, the Discovery Service obtains a baseline inventory of all SAN elements in the SAN. In certain embodiments, an inventory baseline can be created from each user domain. Creation of the inventory baseline may be time based, with the new baseline created periodically (E.g. once a month). Alternatively, creation of the inventory baseline may be changed based, with a change to the network automatically causing creation of the new baseline. Further alternatively, the new baseline is created only at the instruction of the user.

When requested, the Discovery Service will compare the new baseline to the existing baseline and report the difference between baselines. Such mechanism can detect a moved cable or new device in the network quite easily by comparing the discovered topology with the previous baseline.

The user may create a security reporting policy that alerts the SAN network administrator to a variation from the baseline inventory. This alert may take the form of an email message, or in extreme circumstances a pager may be triggered.

The user may also create security based corrective action policy to account for the addition of new devices or for the movement of existing devices.

For addition of new devices to the baseline, the security based corrective action policy may dictate that the device be unsupported, or that an installation program be automatically run. Additions to the baseline can be handled automatically. A device can automatically be installed be assigned to an unsupported device list. Further alternatively, a device can automatically be assigned to an uninstalled device list. Further alternatively, a device can automatically be assigned to an uninstalled device list.

Changes to the baseline can also be handled automatically according to a security based corrective action policy. A device can be automatically re-installed and assigned to a user-configurable user domain at the new location. Alternatively, a device can automatically be assigned to an unsupported device list. Further alternatively, a device can automatically be assigned to an uninstalled device list. For moved devices, the security based corrective action policy may dictate-reinstalling the device at the new location, or placing the device on the unsupported device list.

DEVICE LEVEL SECURITY

Security may also be achieved at the device level by assigning SAN elements to user domains so that only a user who belongs to that domain can access the device. Secure access to the data on a volume may be achieved using at least three methods.

First, access to the volume may be restricted using the host name, the volume identifier, and the host network address. Second, access may be restricted by defining an opcode mapping to access rights and unit reservations to the volume. Third, a unit policy may be defined based on external conditions (such as the time of day) that can change access control of the unit whenever the external condition is met.

SAN Devices may be assigned to one or more user domains, or the Administrator domain may be a superset of all other domains. Mechanisms for making changes to user domains include the ability to add a new domain, to add a user account to a domain, to modify a domain, to modify a user account in a domain, to remove a user from a domain, and to remove a domain.

In certain embodiments, only user from the same domain as the device are permitted to perform user-functions on said devices. In certain embodiments, all virtual devices created from the SAN device may inherit the user domain.

FRAME LEVEL SECURITY

Embodiments in accordance with the present invention may also provide security on the frame level. Secure access to the port at the frame level may be achieved by permitting only legal frames to enter the network storage device. The frame method comprises associating a header with each frame, wherein each header has a type. Should a frame be received from an illegal source, it is logged into the security log as an illegal frame.

Commands may enter the VSX from the SAN via a fibre channel personality module (FCASIC) using a standard fibre channel (FC) SCSI command frame. FIG. 5 is a schematic diagram showing the storage process utilizing the fibre channel personality module. The FC frame is encapsulated into POS format by the personality module and sent to the storage processor (SP).

Figure 6:
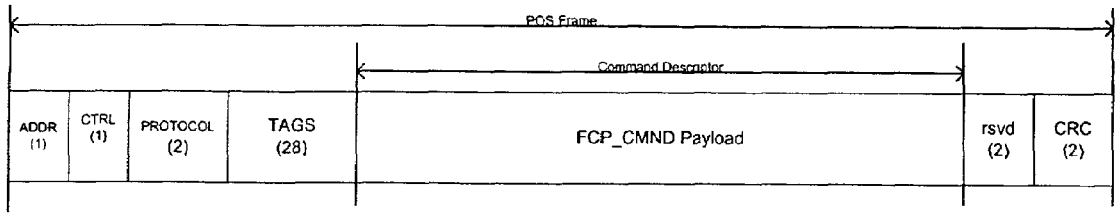
FIG. 6 is a schematic diagram showing the command frame encapsulated in POS format.

Specifically, the FC frame entering the SP is encapsulated within an Ethernet frame. FIG. 6 is a schematic diagram showing the command frame encapsulated in POS format. The SP hardware classifier will look at the PROTOCOL field to determine which routine to call.

Figure 7:
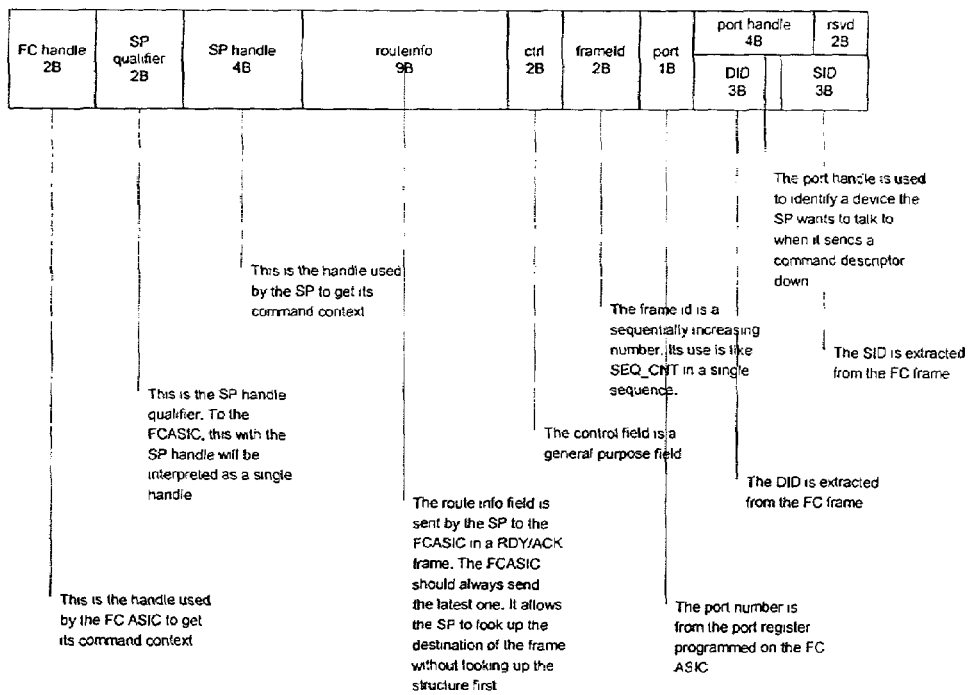
FIG. 7 is a schematic diagram showing the TAGS field format.

FIG. 7 is a schematic diagram showing the TAGS field format. The TAGS header is used to carry unique identifiers between SP's in order to get command context.

The storage processor will verify the ADDR, CTRL, PROTOCOL, RSVD and TAGS before allowing the command to be processed. A frame is considered illegal whenever one of the following conditions is met: the ADDR, CTRL, or PROTOCOL fields contain an invalid value; the RSVD field is non-zero; the frame has an unknown port +SID+DID+FCLUN; or the SID in the TAGS field matches the SID in the encapsulated fibre channel frame, or the DID in the TAGS field matches the SID in the encapsulated fibre channel frame.

The TAGS field provides a high degree of frame level security for a couple of reasons. First, the personality module and storage processor have exchanged some of the TAGS field information prior to receiving any command frames. Second, some information, such as the DID and SID in the fibre channel frame is copied into the Ethernet frame. The likelihood of a malicious attack containing a valid TAGS field is extremely low, since either the ADDR, CTRL, and PROTOCOL fields would contain legal values, or the DID and SID would have to match in both the incoming frame and the encapsulating frame.

In one embodiment, the incoming frame is from one protocol and is encapsulated in its entirely in the frame of another protocol. In addition, some fields from the incoming frame may be copied into the frame encapsulating the incoming frame by the network personality module.

In a specific embodiment, an incoming fibre channel frame is encapsulated into an Ethernet frame. The source identifier, destination identifier, logical unit identifier may be copied from the original fibre channel frame by the fibre channel personality module into the Ethernet frame. The ADDR, CTRL, PROTOCOL, and RSVD fields in the Ethernet frame may contain agreed-upon values, which are assigned by the fibre channel personality module. The frame security module checks if the ADDR, CTRL, PROTOCOL, and RSVD fields in the Ethernet frame contain the agreed-upon values.

The frame security module may check if the source identifier in the Ethernet frame matches the source identifier in the encapsulated fibre channel frame. Alternatively, the frame security module may check if the destination identifier in the Ethernet frame matches the destination identifier in the encapsulated fibre channel frame. Further alternatively, the frame security module may check if the destination identifier in the Ethernet frame matches the destination identifier in the encapsulated fibre channel frame. The frame security module may also check to see if the source identifier, destination identifier, port, and FCLUN identifier are a known valid combination.

According to a security corrective action policy established by the user, illegal frames may be logged in their entirety into the security log, and the FCLUN's access control may be modified. According to reporting policy established by the user, illegal frames may either raise an alarm and send an SNMP trap, or to cause an email to be sent to an account of the SAN network administrator.

COMMAND LEVEL SECURITY

In addition to passing frame level security checks, a command may also be subjected to command level security checks. In SCSI, commands are directed by an initiator to a target or a target's logical unit. Command level security checks pertain to the command operation and the SCSI LUN. In a VSX, the SCSI LUN is referred to as a Virtual LUN (VLUN). Command frames contain an operation instruction generally referred to as the command's opcode. The opcode specifies the intended access of the command on the LUN.

There are several levels of classification of intended access of a command on a logical unit. The "ALL" access classification allows the command source to execute any command on the unit. The "READ ONLY" access classification allows the command source to execute only commands that do not change the unit's media or the unit's metadata. The "LIMITED" access classification allows the command source to execute only discovery commands. Finally, the "NO ACCESS" does not permit the command source to execute any commands on the unit.

Opcodes can be further classified as those opcodes permitted while the units is reserved. A mapping table exists in memory, which identifies the opcodes allowed for access. The mapping table further includes a section for Vendor-Unique opcodes. The mapping table also includes a mapping of opcodes to unit reservations such that reservations are not violated.

A parameter-based system is used to manage differences between Vendor-unique opcodes. This is needed because a Vendor-unique opcode of ECh might violate a unit reservation from Vendor "A", and not violate a unit reservation from Vendor "B". The Vendor profile captures the possible choices available for vendor-unique opcodes. The mapping table is then built from the profile and the standard SCSI command set. Lastly, the Vendor is associated with a WWN, SID, DID, FCLUN, and PORT.

Figure 8:
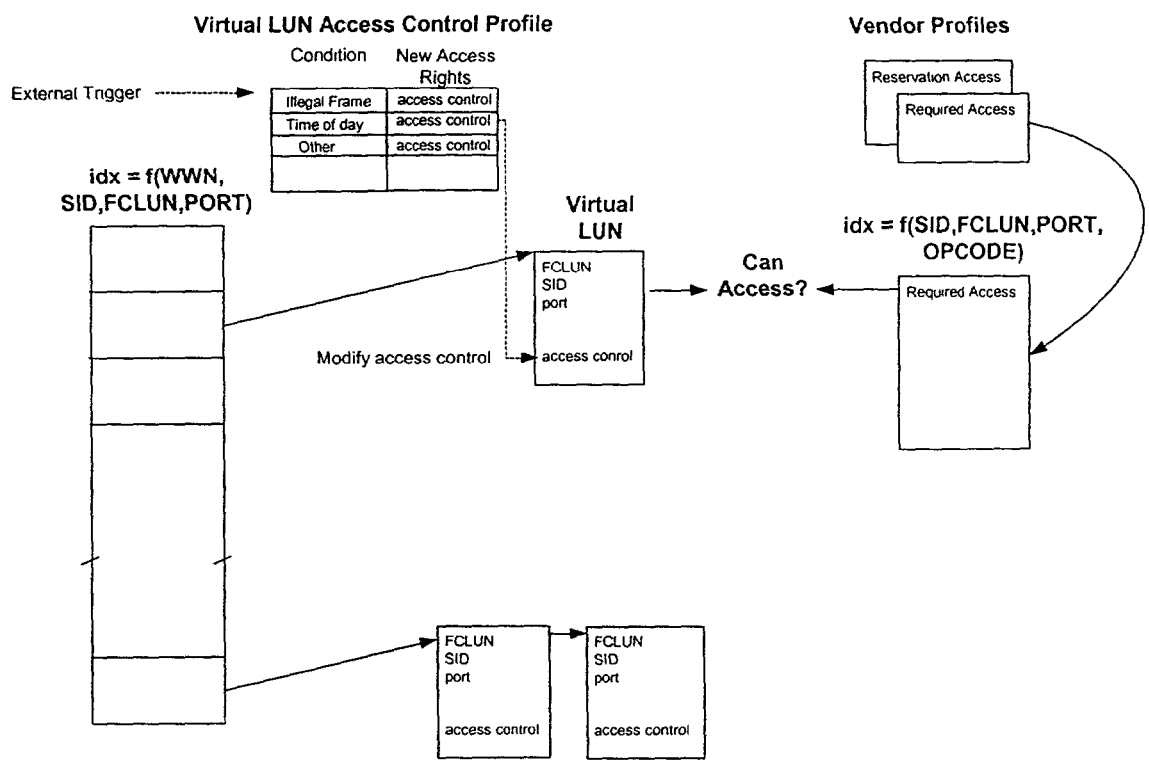
FIG. 8 is a schematic diagram showing a VLUN search and access control check.

FIG. 8 is a schematic diagram showing a VLUN search and access control check. The storage processor will perform a search for the virtual LUN from the WWN, SID, DID, FCLUN, and PORT fields in the frame. The SID is used to prevent another port form using the WWN of an existing port. The virtual LUN will contain the access rights and unit state for this host.

First a quick check for the LUN reservations is performed. If reserved, the reservation is checked to compare against the source node. It the source node matches the reservation node then the command is allowed to proceed. If the source node does not match the reservation node, then the opcode will be checked against the opcode table for unit reservations for the source node. If the opcode can be executed with the unit reserved it is allowed to proceed, otherwise a standard response can be used to indicate UNIT RESERVATION CONFLICT.

Next, access control checks are performed by the storage processor. Access control is checked on at the LUN level. Each virtual LUN will have an access control field. This will be the access level permitted. This is checked against the FCP_CDB opcode. The opcode is used as an index to look up the required access. The required access is compared to the access control field, and access is granted when required access is less than or equal to the access control field.

Lastly, the VLUN's access control field is dynamic. A user policy is established which specifies the access control as a function an external trigger. Such external triggers can include the passage of time, a user changing the default access rights, or a generic security violation, such as an illegal frame.

A Command level security screening may be performed on operations sent by initiators to targets and virtual LUNs. The combination of SID, source WWN, DID, destination WWN, FCLUN and PORT is defined in a mapping table.

A command opcode map including Vendor-unique opcodes may classify opcodes required access according to several categories. One category is form commands that require the unit to be reserved. Another category is for commands that do not require the unit to be reserved. Still another category is for commands that require both READ and WRITE access. Yet another category is for commands that require only READ access. Another category is for commands that require LIMITED access.

A parameter-based mechanism for making changes to opcode maps may include several methods. These methods include adding a Vendor, adding a Vendor-specific opcode with required access rights, modifying the access rights required for a Vendor-specific opcode, removing a Vendor-specific opcode, and removing a Vendor.

A command security modulate may verify command access to a LUN. The unit may be reserved for those commands requiring the unit to be reserved. Alternatively, the unit may not be reserved for those commands that do not require the unit to be reserved. The unit's access control is ALL access for those commands that require both READ and WRITE access. The unit's access control is at least READ Access for those commands that require only READ access. The unit's access control is at least LIMITED Access for those commands that require LIMITED access.

A rule based security action policy may be established by the user which specifies the access control value as a function of changes of the date and time to a predetermined value. Alternatively, the access control value may be specified as a function of user changes to one or more properties in the default access rights.

According to a security corrective policy established by a user, the access control value may be specified in response to a general security violation, including, but not limited to receipt of an illegal frame, crossing of a threshold of illegal frames, or a user offering over a threshold number of invalid passwords while attempting trying to log into the same specific user domain belonging to the virtual LUN. And as decried above in connection with the other levels of security protection, a security reporting policy implemented by a user may also issue alarms to the SAN network administrator.

The above description is illustrated and not restrictive, and as such the parameters and configurations listed above should not be limiting to the claims as described herein. Thus while the invention is illustrated above with reference to one particular embodiment, one of ordinary skill in the art would recognize that the present invention is not limited to this particular example.

For example, while the above figures and descriptions thereof relate to a fibre channel based SAN, embodiments of the present invention are not limited to that particular configuration. Alternate embodiments in accordance with the present invention may utilize an Ethernet based SAN using iSCSI storage protocol, or any other general network.

Embodiments of methods and structures for ensuring security of a storage area network in accordance with the present invention offer a number of advantages over conventional approaches.

For example, embodiments in accordance with the present invention provide a centralized method for defining various levels of access to information about devices in a network that improves significantly over the conventional method of widely distributed access control. Access is put into a single device, and a scheme is created intelligently handle Vendor-unique requests in a heterogeneous network. An automated method is further provided to change a host's command level security profile, based on heuristics.

Specifically, embodiments in accordance with the present invention may provide a method for determining a user's right to view physical SAN topology, a host's right to access a network port, and a host's right to access a logical unit with a particular SCSI command. To accomplish the access control, policies are established by the user when configuring the storage and installing devices into the SAN.

Embodiments in accordance with the present invention may also facilitate global storage management and security by providing the user the capability of assigning a SAN device to a user domain. Only users granted permission to that domain could view network topology and status information.

Embodiments in accordance with the present invention may also provide an important technical advantage by discovering illegal frames received on a port using an invalid combination of source to destination address options. Whenever an illegal frame is discovered, the invention provides a means to modify the access rights on the volume.

Embodiments in accordance with the present invention may provide yet a further technical advantage by providing hosts a set of access rights to LUNs, including incorporating Vendor-unique opcodes used in in-band management into a table of opcodes specifying required access rights and unit reservation requirements.

Embodiments in accordance with the present invention may further provide an automated method for varying the access rights for a host on a volume. A time-based access rules policy is available to modify the host's access rights to a volume only for certain hours in the day. This provides a tremendous advantage over today's manual method. In addition, a host's access rights can be changed in the event of a security breach, such as the receipt of an illegal frame.

Although the above description has focused on specific embodiments, numerous variations and their equivalents are considered to be within the scope of the present invention, which is defined by the following claims. When the claims discuss process or method steps, the steps are intended to be performed in any order or simultaneously except where specifically noted.

What is claimed is:

1. A method of controlling security of information on a storage area network (SAN), the method comprising:
    identifying a plurality of users of the SAN, each user having a different security profile, wherein the SAN comprises a plurality of host devices and storage devices and a management interface;
    assigning each user a user domain;
    assigning a set of one or more authorized user domains to each device of the SAN during a device initialization process, such that the existence of each device on the SAN is revealed only to users assigned an authorized user domain of said device; and
    creating a security reporting policy through the management interface to cause an attempted detection of a SAN device by a user lacking the authorized user domain to produce specified output to an administrator of the SAN.

2. The method of claim 1 further comprising creating a security corrective action policy through the management interface, such that attempted detection of a SAN device by a user lacking the authorized user domain produces a default action authorized by an administrator of the SAN.

3. A method of controlling security of information on a storage area network (SAN), the method comprising:
    receiving at a personality module a first information frame from a host device of the SAN, the first information frame including a header and a payload, the header including source device information and destination device information corresponding to the host device, wherein the SAN comprises at least another host device, a plurality of storage devices and a management interface;
    causing the personality modulate to encapsulate the first information frame into a second information frame including a header and a payload, the header including a copy of the source device information and the destination device information;
    transmitting the second information frame to a storage processor of the SAN;
    causing the storage processor to detect consistency between the source device information and the destination device information of the header and payload of the second information frame; and
    creating a security reporting policy through the management interface to cause an inconsistency between the source device information and the destination device information of the header and payload of the second information frame to produce a specified output to an administrator of the SAN.

4. The method of claim 3 further comprising creating a security corrective action policy through the management interface to cause an inconsistency between the source device information and the destination device information of the header and payload of the second frame to produce a default change in access rights authorized by an administrator of the SAN.

5. A method of controlling security of information on a storage area network (SAN), the method comprising:
    identifying a plurality of host devices in communication with the SAN, the host devices configured to transmit user initiated commands to the SAN, wherein each command includes a vendor-specific opcode, wherein the SAN comprises a plurality of storage devices and a management interface;
    using a table to correlate each vendor-specific opcodes with a level of access right specific to a particular storage device, the level of access right selected from the group consisting of ALL, READ ONLY, LIMITED, and NO ACCESS;
    receiving a command from a host device, wherein the command is addressed to a particular storage device of the SAN;
    authorizing a user who initiated the command to access the particular storage device according to the access rights granted to the vendor-specific opcode of the command; and
    creating a security reporting policy through the management interface to cause an attempted access of a particular storage device contrary to the granted access rights to produce a specified output to an administrator of the SAN.

6. The method of claim 5 further comprising creating a security corrective action policy through the management interface to cause an attempted access of a particular storage device contrary to the granted access rights to produce a default action authorized by an administrator of SAN.

7. The method of claim 5 further comprising creating a rule-based security action policy through the management interface, such that the granted access rights can be automatically scheduled and varied over time as authorized by an administrator of the SAN.

8. A method of controlling security of information on a storage area network (SAN), the method comprising:
    identifying a plurality of host devices in communication with the SAN, the host devices configured to transmit opcodes to the SAN, wherein the SAN comprises a plurality of storage devices and a management interface;
    using a table to correlate the opcodes with a level of access right specific to a particular storage device, the level of access right selected from the group consisting of ALL, READ ONLY, LIMITED, and NO ACCESS;
    authorizing a command represented by an opcode received from a host device to be executed on a particular storage device to which the command is addressed according to the access rights granted to the opcode with respect to the particular storage device;
    creating a security reporting policy through the management interface to cause an attempted access of a particular storage device contrary to the granted access rights to produce a specified output to an administrator of the SAN; and
    creating a rule-based security action policy through the management interface, such that the granted access rights can be automatically scheduled and varied over time as authorized by an administrator of the SAN.

9. A machine-readable medium having sequences of instructions stored therein which, when executed by a processor of a computer, cause the processor to perform a process comprising:

assigning a user domain to each user of a plurality of users of a storage area network (SAN), each user having a different security profile, wherein the SAN comprises a plurality of host and storage devices and a management interface;

assigning a set of one or more authorized user domains to each device of the SAN during a device initialization process, such that the existence of each device on the SAN is revealed only to users assigned an authorized user domain of said device;

creating a specified output to an administrator of the SAN according to a security reporting policy created through the management interface upon the occurrence of an attempted detection of a SAN device by a user lacking the authorized user domain; and creating a default action authorized by an administrator of the SAN according to a security corrective action policy created through the management interface upon the occurrence of an attempted detection of a SAN device by a user lacking the authorized user domain.

10. A processing system comprising:

a processor; and a memory coupled to the processor, the memory storing instructions which when executed by the processor, cause the processing system to perform a process comprising:

conducting a baseline inventory of all devices connected with a storage area network (SAN), wherein the SAN comprises a plurality of host and storage devices and a management interface;

creating a specified output to an administrator of the SAN according to a security reporting policy created through the management interface upon a change in the baseline inventory of the SAN; and creating a default action authorized by an administrator of the SAN according to a security corrective action policy created through the management interface upon a change in the baseline inventory of the SAN produces.

11. A processing system comprising:

a processor; and a memory coupled to the processor, the memory storing instructions which when executed by the processor, cause the processing system to perform a process comprising:

receiving at a personality module a first information frame from a hose device of a storage area network (SAN), the first information frame including a header and a payload, the header including source device information and destination device information corresponding to the host device, wherein the SAN comprises at least another host device, a plurality of storage devices and a management interface;

causing the personality modulate to encapsulate the first information frame into a second information frame including a header and a payload, the header including a copy of the source device information and the destination device information;

transmitting the second information frame to a storage processor of the SAN;

causing the storage processor to detect consistency between the source device information and the destination device information of the header and payload of the second information frame;

creating an output to an administrator of the SAN according to a security reporting policy created through the management interface upon the detection of inconsistency between the source device information and the destination device information of the header and payload of the second frame; and creating a default change in access rights authorized by an administrator of the SAN according to a security corrective action policy created through the management interface upon the detection of inconsistency between the source device information and the destination device information of the header and payload of the second frame produces.

12. A processing system comprising:

a processor; and a memory coupled to the processor, the memory storing instructions which when executed by the processor, cause the processing system to perform a process comprising:

identifying a plurality of host devices in communication with a SAN, the host devices configured to transmit user initiated commands to the SAN, wherein each command includes an opcode, wherein the SAN comprises a plurality of storage devices and a management interface, creating a table to correlate a plurality of commands with a plurality of levels of access right specific to each of a plurality of storage devices of a SAN, the level of access right selected from the group consisting of ALL, RAD ONLY, LIMITED, and NO ACCESS;

receiving a command from a host device, wherein the command is addressed to a particular storage device of the SAN; and authorizing a user who initiated the command to access the particular storage device according to the access rights granted to the vendor-specific opcode of the command.

13. The process system of claim 12, wherein the process further comprises creating a default action authorized by an administrator of SAN according to a security corrective action policy created through the management interface upon the occurrence of an attempted access of a particular storage device contrary to the granted access rights.

14. The processing system of claim 12, wherein the process further comprises creating an output to an administrator of the SAN according to a security reporting policy through the management interface upon the occurrence of an attempted access of a particular storage device contrary to the granted access rights.

15. The processing system of claim 12, wherein the process further comprises automatically scheduling and modifying the granted access rights over time as authorized by an administrator of the SAN according to a rule-based security action policy created through the management interface.

* * * * *